(12) United States Patent
Ookawa

(10) Patent No.: US 9,485,167 B2
(45) Date of Patent: Nov. 1, 2016

(54) COMMUNICATION DEVICE AND ADDRESS LEARNING METHOD

(71) Applicant: FUJITSU LIMITED, Kawasaki-shi, Kanagawa (JP)

(72) Inventor: Shigemori Ookawa, Hakusan (JP)

(73) Assignee: FUJITSU LIMITED, Kawasaki (JP)

( * ) Notice: Subject to any disclaimer, the term of this patent is extended or adjusted under 35 U.S.C. 154(b) by 191 days.

(21) Appl. No.: 14/191,575

(22) Filed: Feb. 27, 2014

(65) Prior Publication Data

US 2014/0321470 A1 Oct. 30, 2014

(30) Foreign Application Priority Data

Apr. 24, 2013 (JP) ................................ 2013-091713

(51) Int. Cl.
| | |
|---|---|
| H04L 12/28 | (2006.01) |
| H04L 12/56 | (2006.01) |
| H04L 12/751 | (2013.01) |
| H04L 12/931 | (2013.01) |
| H04L 12/935 | (2013.01) |

(52) U.S. Cl.
CPC ........... *H04L 45/08* (2013.01); *H04L 49/3009* (2013.01); *H04L 49/354* (2013.01)

(58) Field of Classification Search
CPC .. H04L 45/08; H04L 49/3009; H04L 49/354
See application file for complete search history.

(56) References Cited

U.S. PATENT DOCUMENTS

| | | | |
|---|---|---|---|
| 7,590,076 B2 * | 9/2009 | Sumino | H04L 45/02 370/255 |
| 9,036,660 B2 * | 5/2015 | Zhang | H04L 45/02 370/475 |
| 2003/0081602 A1 | 5/2003 | Kawarai et al. | |
| 2004/0120269 A1 | 6/2004 | Sumino et al. | |
| 2013/0188645 A1 * | 7/2013 | Mack-Crane | H04L 12/4625 370/392 |

FOREIGN PATENT DOCUMENTS

| | | |
|---|---|---|
| JP | 2003-134158 | 5/2003 |
| JP | 2004-194145 | 7/2004 |
| JP | 2008-42735 | 2/2008 |

* cited by examiner

*Primary Examiner* — Lonnie Sweet
(74) *Attorney, Agent, or Firm* — Staas & Halsey LLP

(57) ABSTRACT

A processor determines, when a frame is received, whether a total of current learning numbers stored in a second storage unit has reached a total of maximum learning numbers. The processor identifies in the second storage unit, if it is determined that the total of current learning numbers has reached the total of maximum learning numbers, a first group identifier associated with a lower priority than a priority associated with a reception group identifier contained in the frame. The first group identifier is associated with a first current learning number not less than a first minimum learning number associated with the first group identifier. The processor replaces a first correspondence relationship including the first group identifier with a reception correspondence relationship among a port number of a port at which the frame has been received, a source address contained in the frame, and the reception group identifier.

8 Claims, 13 Drawing Sheets

FIG. 2

| DA | SA | VLAN ID | Type | Payload | FCS |

FIG. 4

| ENTRY NUMBER | V | PORT NUMBER | MAC ADDRESS | VLAN ID | AGING VALUE |
|---|---|---|---|---|---|
| 1 | 1 | 1 | A | #1 | 2 |
| ... | ... | ... | ... | ... | ... |
| 100 | 1 | 2 | B | #2 | 4 |
| 101 | 1 | 3 | E | #3 | 3 |
| ... | ... | ... | ... | ... | ... |
| 19000 | 1 | 3 | C | #3 | 2 |

| VLAN ID | CURRENT LEARNING NUMBER | MINIMUM LEARNING NUMBER | MAXIMUM LEARNING NUMBER | PRIORITY | AGING TIMER VALUE |
|---|---|---|---|---|---|
| #1 | 6000 | 5000 | 8000 | HIGH | 10 |
| #2 | 6000 | 4000 | 6000 | MEDIUM | 10 |
| #3 | 7000 | 3000 | 5000 | LOW | 5 |
| ALL | 19000 | - | 19000 | - | - |

FIG. 7

Table 13 (top):

| VLAN ID | CURRENT LEARNING NUMBER | MINIMUM LEARNING NUMBER | MAXIMUM LEARNING NUMBER | PRIORITY | AGING TIMER VALUE |
|---|---|---|---|---|---|
| #1 | 9000 | 5000 | 8000 | HIGH | 10 |
| #2 | 7999 | 4000 | 6000 | MEDIUM | 10 |
| #3 | 2001 | 3000 | 5000 | LOW | 5 |
| ALL | 19000 | - | 19000 | - | - |

Table 12 (top):

| ENTRY NUMBER | V | PORT NUMBER | MAC ADDRESS | VLAN ID | AGING VALUE |
|---|---|---|---|---|---|
| 1 | 1 | 1 | A | #1 | 2 |
| ... | ... | ... | ... | ... | ... |
| 100 | 1 | 2 | B | #2 | 4 |
| 101 | 1 | 3 | E | #3 | 0 |
| ... | ... | ... | ... | ... | ... |
| 19000 | 1 | 3 | C | #3 | 3 |

⇑

Table 13 (bottom):

| VLAN ID | CURRENT LEARNING NUMBER | MINIMUM LEARNING NUMBER | MAXIMUM LEARNING NUMBER | PRIORITY | AGING TIMER VALUE |
|---|---|---|---|---|---|
| #1 | 9000 | 5000 | 8000 | HIGH | 10 |
| #2 | 8000 | 4000 | 6000 | MEDIUM | 10 |
| #3 | 2000 | 3000 | 5000 | LOW | 5 |
| ALL | 19000 | - | 19000 | - | - |

Table 12 (bottom):

| ENTRY NUMBER | V | PORT NUMBER | MAC ADDRESS | VLAN ID | AGING VALUE |
|---|---|---|---|---|---|
| 1 | 1 | 1 | A | #1 | 2 |
| ... | ... | ... | ... | ... | ... |
| 100 | 1 | 2 | B | #2 | 3 |
| 101 | 1 | 2 | F | #2 | 4 |
| ... | ... | ... | ... | ... | ... |
| 19000 | 1 | 3 | C | #3 | 3 |

⇑

COMMUNICATION DEVICE AND ADDRESS LEARNING METHOD

CROSS-REFERENCE TO RELATED APPLICATION

This application is based upon and claims the benefit of priority of the prior Japanese Patent Application No. 2013-091713, filed on Apr. 24, 2013, the entire contents of which are incorporated herein by reference.

FIELD

The embodiment discussed herein is related to a communication device and an address learning method.

BACKGROUND

To date, switches, which are communication devices for relaying frames, have been used in frame communication networks such as Ethernet (registered trademark). A switch employs a media access control (MAC) learning function in order to perform frame transfer.

That is, when a frame is received, a switch that employs a MAC learning function stores a correspondence relationship between a port at which the frame is received and the MAC address of a terminal that is the transmission source of the frame, in a table called a MAC learning table. When receiving a frame destined for a MAC address stored in the MAC learning table from another port, the switch transfers the received frame from a port that has been learned in the MAC learning table.

In recent years, there has been proposed a learning scheme in which the MAC addresses of terminals are learned for each group called a virtual local area network (VLAN) where terminals connected via a port to a switch are virtually combined into a group. In this learning scheme, a switch holds, in a MAC learning table, a correspondence relationship among a port, a MAC address, and an identifier (referred to as a VLAN ID) of a VLAN to which a terminal having the MAC address belongs. The switch further holds, in the MAC learning table, the number of learned correspondence relationships and a maximum number of learned correspondence relationships in association with the VLAN ID. Upon receipt of a frame, the switch compares the number of learned correspondence relationships with the maximum number of learned correspondence relationships, both of which are associated with a VLAN ID contained in the frame, and does not learn the source MAC address of the frame if the number of learned correspondence relationships has reached the maximum number of learned correspondence relationships. Thus, the fairness among VLANs in the number of MAC addresses learned in the MAC learning table is maintained.

A related technique is disclosed in, for example, Japanese Laid-open Patent Publication No. 2004-194145.

In the above-described related-art technique, however, consideration has not been given to achieving efficient address learning in accordance with priorities while securing a minimum number of learned correspondence relationships for each group.

That is, in the related-art technique, even when a frame is received from a VLAN, the source MAC address of the frame is not learned if the number of learned correspondence relationships in the MAC learning table has reached the maximum number of learned correspondence relationships associated with the VLAN ID. For this reason, in the related-art technique, if the total of the numbers of learned correspondence relationships associated with VLAN IDs of VLANs having relatively high priorities and the VLAN IDs of VLANs having relatively low priorities has reached the total of maximum numbers of learned correspondence relationships. As a result, with the related-art technique, there is a possibility that a frame from a VLAN having a relatively high priority may be discarded or flooded.

SUMMARY

According to an aspect of the present invention, provided is a communication device including a first storage unit, a second storage unit, and a processor. The first storage unit stores therein learned entries each storing therein a correspondence relationship among a port number for identifying a port, an address of a terminal connected via the port, and a group identifier for identifying a terminal group to which the terminal belongs. The terminal group is one of a plurality of terminal groups. The second storage unit stores therein a current learning number, a minimum learning number, a maximum learning number, and a predetermined priority in association with each group identifier. The current learning number indicates a number of the learned entries currently stored in the first storage unit. The minimum learning number indicates a minimum value of the current learning number. The maximum learning number indicates a maximum value of the current learning number. The processor is configured to determine, when a frame is received, whether a total of current learning numbers stored in the second storage unit has reached a total of maximum learning numbers. The processor is configured to identify in the second storage unit, if it is determined that the total of current learning numbers has reached the total of maximum learning numbers, a first group identifier associated with a lower priority than a priority associated with a reception group identifier contained in the frame. The first group identifier is associated with a first current learning number not less than a first minimum learning number associated with the first group identifier. The processor is configured to perform, in the first storage unit, first replacement of a first correspondence relationship including the first group identifier with a reception correspondence relationship among a port number of a port at which the frame has been received, a source address contained in the frame, and the reception group identifier.

The objects and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates an example of a data structure of a frame in the embodiment;

FIG. 4 is a table listing an example of information stored in a MAC learning table in the embodiment;

FIG. 7 is an illustration for explaining an example of processing performed by the VLAN identification unit and the storage controller in the embodiment;

DESCRIPTION OF EMBODIMENT

In order to learn the source MAC address of a frame from a VLAN having a relatively high priority, an approach to delete a MAC address corresponding to a VLAN ID having a relatively low priority from a MAC learning table is conceivable. With this approach, however, there is a possibility that it may become difficult to secure the minimum number of learned correspondence relationships for each VLAN.

Embodiment

Hereinafter, an embodiment will be described in detail with reference to the drawings. It is to be noted that the disclosed technique is not limited by the present embodiment.

Figure 1:
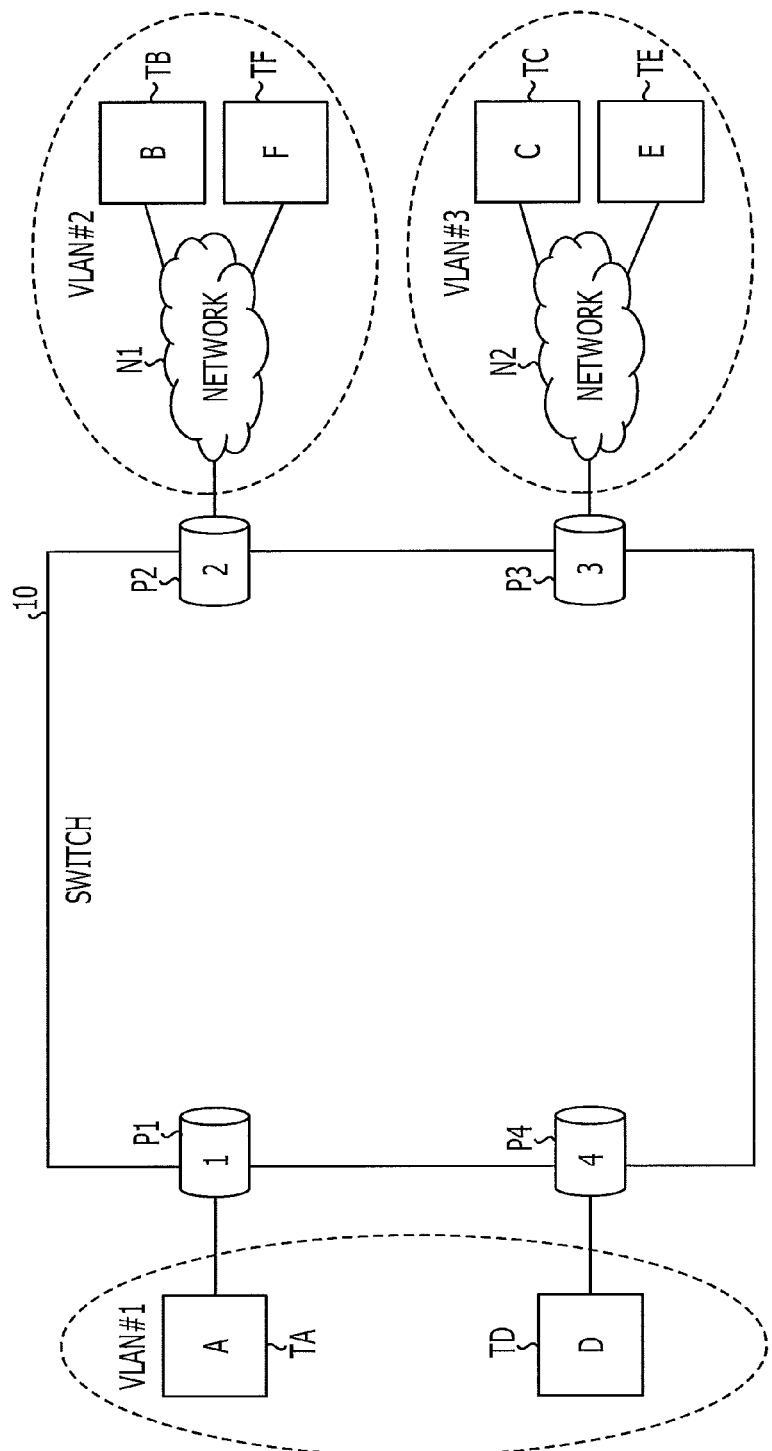
FIG. 1 is a block diagram illustrating an example of a configuration of a network including a switch according to an embodiment.

FIG. 1 is a block diagram illustrating an example of a configuration of a network including a switch according to the present embodiment. A switch 10 illustrated in FIG. 1 is a communication device for relaying received data to a transmission destination. The communication device is, for example, a "layer 2" (L2) switch, a switching hub, a "layer 3" (L3) switch, a router, or a server having a switching function.

The switch 10 is connected via a port P1 to a terminal TA such as a server having a MAC address "A". The switch 10 is connected, via a port P2 and a network N1 connected to the port P2, to a terminal TB having a MAC address "B" and a terminal TF having a MAC address "F". The switch 10 is connected, via a port P3 and a network N2 connected to the port p3, to a terminal TC having a MAC address "C" and a terminal TE having a MAC address "E". The switch 10 is connected via a port P4 to a terminal TD having a MAC address "D". Note that the terminals TA to TF are not limited to servers, and may be data relay devices such as switches, or computers, for example.

The switch 10 implements a virtual local area network VLAN#1, which is a virtual group, using the terminal TA to which the switch 10 is connected via the port P1 and the terminal TD to which the switch 10 is connected via the port P4. The switch 10 implements a virtual local area network VLAN#2 using the network N1, the terminal TB, and the terminal TF to which the switch 10 is connected via the port P2. The switch 10 implements a virtual local area network VLAN#3 using the network N2, the terminal TC, and the terminal TE to which the switch 10 is connected via the port P3. VLAN IDs for identifying the VLAN#1 to VLAN#3 are defined as "#1" to "#3", respectively. Predetermined priorities are assigned to VLAN#1 to VLAN#3, respectively. For example, "high", "medium" and "low" priorities are assigned to VLAN#1 to VLAN#3, respectively.

The switch 10 includes a first storage unit that stores a correspondence relationship among a port number identifying a port, an address of a terminal connected via the port, and a VLAN ID for identifying a VLAN to which the terminal belongs. The switch 10 also includes a second storage unit that stores, in association with the VLAN ID, a current learning number indicating the number of correspondence relationships currently stored in the first storage unit, a minimum learning number indicating a minimum value of the current learning number, a maximum learning number indicating a maximum value of the current learning number, and a predetermined priority. The switch 10 also includes a determination unit that, when a frame is received, determine whether the total of current learning numbers stored in the second storage unit has reached the total of maximum learning numbers. If the total of the current learning numbers has reached the total of the maximum learning numbers, the switch 10 identifies, with reference to the second storage unit, a contented VLAN ID associated with a lower priority than a priority associated with a VLAN ID (hereinafter referred to as a "reception VLAN ID") contained in the received frame. The contented VLAN ID is a VLAN ID that is associated with a current learning number not less than the associated minimum learning number. Thereafter, the switch 10 stores a correspondence relationship among the port number of a port at which the frame has been received, the source address of the frame, and the reception VLAN ID, in place of a correspondence relationship including the identified other VLAN ID.

In this way, when the total of current learning numbers has reached the total of maximum learning numbers during address learning upon receipt of a frame, the switch 10 according to the present embodiment identifies a contented VLAN ID associated with a lower priority than a priority associated with the reception VLAN ID contained in the received frame. Then, the switch 10 according to the present embodiment learns a correspondence relationship among a port number of a port at which the frame has been received, a source address of the frame, and the reception VLAN ID in such a way that a correspondence relationship including the identified other VLAN ID is overwritten with the learned correspondence relationship.

For example, it is assumed that the switch 10 receives a frame, in which the source address is the MAC address "D" and the VLAN ID is "#1", from the port P4. Also, it is assumed that a current learning number associated with a contented VLAN ID "#3" has reached the associated minimum learning number. In this case, the switch 10 identifies VLAN#3 having a lower priority than a priority of VLAN#1 specified by the frame, and whose current learning number has reached its minimum learning number. Then, the switch 10 learns a correspondence relationship among the source MAC address "D" of the frame, a port number "4" of the port P4 at which the frame has been received, and the VLAN ID "#1" contained in the frame, in place of a correspondence relationship (for example, a correspondence relationship among the MAC address "C", a port number "3", and the VLAN ID "#3") related to the identified VLAN#3.

Accordingly, if a frame is received from a VLAN having a high priority under the condition that the total of current learning numbers of addresses has reached the total of maximum learning numbers, the switch 10 is able to learn information such as the source address of the frame in such a way that information on a contented VLAN having a lower priority is overwritten with the learned information. The contented VLAN is a VLAN whose current learning number has reached its minimum learning number. That is, the switch 10 may learn information contained in a frame received from a VLAN having a relatively high priority while inhibiting information of a VLAN whose minimum learning number has not been reached from being deleted. As a result, the switch 10 may perform efficient address learning in accordance with priorities while securing a minimum number of learned correspondence relationships for each VLAN.

Figure 2:
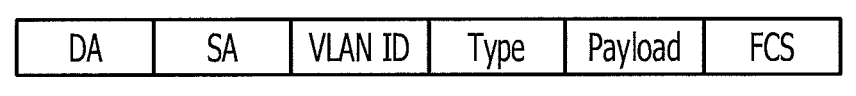

Next, an example of a data structure of a frame in the present embodiment will be described. FIG. 2 illustrates an example of a data structure of a frame in the present embodiment. The frame illustrated in FIG. 2 is a MAC frame, for example. The frame illustrated in FIG. 2 includes fields of "Destination Address (DA)", "Source Address (SA)", "VLAN ID", "Type", "Payload", and "Frame Check Sequence (FCS)". The "DA" field stores a destination MAC address of the frame. The "SA" field stores a source MAC address of the frame. The "VLAN ID" field stores an identifier for identifying a VLAN to which the transmission source of the frame belongs. The "Type" field stores a type of the data stored in the "Payload" field. The "Payload" field is a region where data is stored. The "FCS" field stores a code for detecting an error in a frame.

Figure 3:
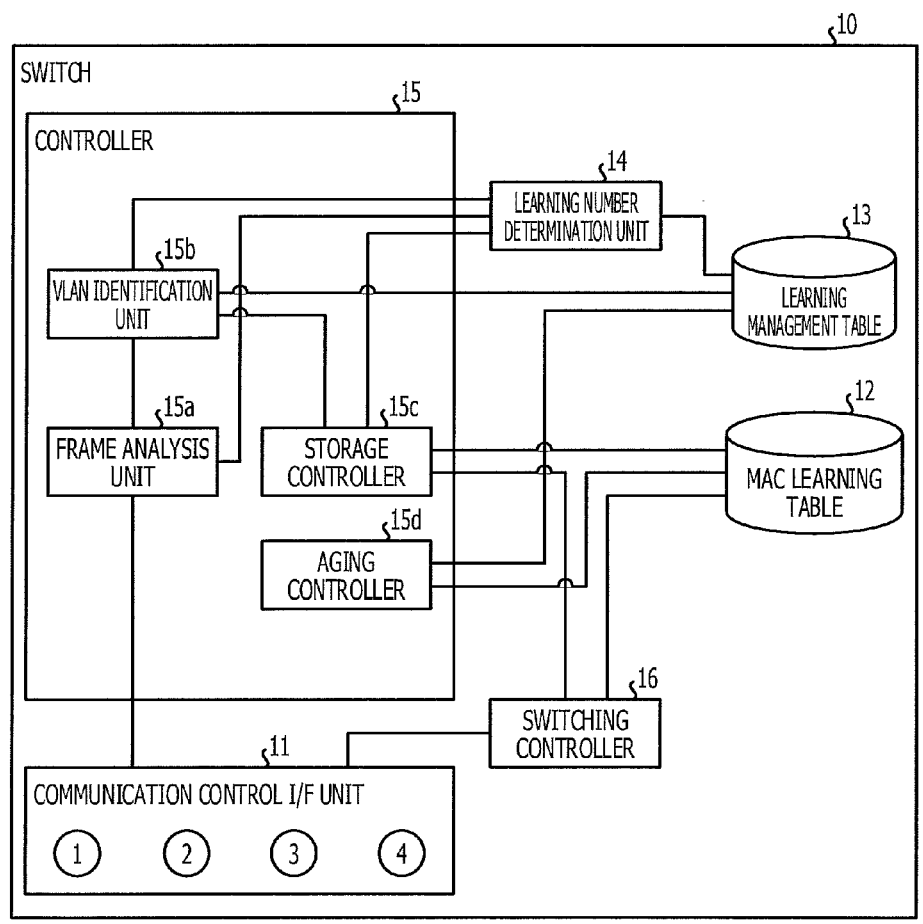
FIG. 3 is a block diagram illustrating an example of a functional configuration of a switch according to the embodiment.

Next, the functional configuration of the switch 10 illustrated in FIG. 1 will be described. FIG. 3 is a block diagram illustrating an example of a functional configuration of a switch according to the present embodiment. As illustrated in FIG. 3, the switch 10 includes a communication control interface (I/F) unit 11, a MAC learning table 12, a learning management table 13, a learning number determination unit 14, a controller 15, and a switching controller 16.

Note that the learning number determination unit 14, the controller 15, the switching controller 16, and so on are integrated circuits or electronic circuits. Note also that the MAC learning table 12, the learning management table 13, and so on are implemented as storage devices such as semiconductor devices or hard disks.

The communication control I/F unit 11 has ports P1 to P4 to which port numbers "1" to "4" are respectively assigned, and is an interface for controlling communication with external terminals and so on. The communication control I/F unit 11 receives a frame at a predetermined port, and outputs the received frame to a frame analysis unit 15a described later. The communication control I/F unit 11 sends a frame output from the switching controller 16 to a transmission destination via a predetermined port.

The MAC learning table 12 stores therein correspondence relationship among a port number for identifying a port, a MAC address of a terminal connected via the port, and a VLAN ID for identifying a VLAN to which the terminal is belongs. The MAC learning table 12 is an example of the first storage unit. FIG. 4 is a table listing an example of information stored in the MAC learning table 12 in the present embodiment. In the MAC learning table 12 illustrated in FIG. 4, information is registered in an entry whenever learning is performed. In each entry of the MAC learning table 12, items such as "entry number", "V", "port number", "MAC address", "VLAN ID", and "aging value" are stored in association with one another.

The "entry number" is a number that identifies an entry of MAC learning table 12, in which a correspondence relationship among a port number, a MAC address, and a VLAN ID (this correspondence relationship may be simply referred to as a "correspondence relationship" as appropriate hereinafter) is stored. In the present embodiment, it is assumed that there are 19000 entries of the MAC learning table 12 in all. The "V" is a flag indicating whether an entry is in a learned state or in an empty state. That is, if "V" is 1, it indicates that a correspondence relationship has been learned in the entry, whereas if "V" is 0, it indicates that a correspondence relationship has not been learned. The "port number" is a port number that identifies a port P1, P2, P3, or P4 that the communication control I/F unit 11 has. The "MAC address" is a MAC address of a terminal connected via a port having the "port number". The "VLAN ID" is an identifier for identifying a VLAN to which the terminal having the "MAC address" belongs. The "aging value" is a value indicating a period of time elapsed since the correspondence relationship among the port number, the MAC address, and the VLAN ID was stored in the MAC learning table 12.

The entry having an entry number "1" in FIG. 4 indicates that the terminal TA having a MAC address "A" and belonging to VLAN#1 is connected via the port P1 having a port number "1" and that the elapsed time of the correspondence relationship of the entry having the entry number "1" is "2". The entry having an entry number "100" indicates that the terminal TB having a MAC address "B" and belonging to VLAN#2 is connected via the port P2 having a port number "2" and that the elapsed time of the correspondence relationship of the entry having the entry number "100" is "4". The entry having an entry number "101" indicates that the terminal TE having a MAC address "E" and belonging to VLAN#3 is connected via the port P3 having a port number "3" and that the elapsed time of the correspondence relationship of the entry having the entry number "101" is "3". The entry having an entry number "19000" indicates that the terminal TC having a MAC address "C" and belonging to VLAN#3 is connected via the port P3 having a port number "3" and that the elapsed time of the correspondence relationship of the entry having the entry number "19000" is "2".

Figure 5:
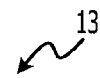
FIG. 5 is a table listing an example of information stored in a learning management table in the embodiment.

The learning management table 13 stores therein a current learning number indicating the number of correspondence relationships currently stored in the MAC learning table 12, a minimum learning number indicating a minimum value of the current learning number, a maximum learning number indicating a maximum value of the current learning number, and a predetermined priority, in association with a VLAN ID. The learning management table 13 is an example of the second storage unit. FIG. 5 is a table listing an example of information stored in a learning management table in the present embodiment. In each entry of the learning management table 13 illustrated in FIG. 5, items such as "VLAN ID", "current learning number", "minimum learning number", "maximum learning number", "priority", and "aging timer value" are stored in association with one another.

The "VLAN ID" corresponds to a VLAN ID included in a correspondence relationship stored in the MAC learning table 12. The "current learning number" is the number of correspondence relationships currently stored in the MAC learning table 12. The "minimum learning number" is a minimum value of the current learning number. The "maximum learning number" is a maximum value of the current learning number. Note that "ALL" in the "VLAN ID" item represents all VLANs, the "current learning number" corresponding to "ALL" indicates the total of current learning numbers of all VLANs, and the "maximum learning number" corresponding to "ALL" indicates the total of the maximum learning numbers of all VLANs. If the "current learning number" corresponding to "ALL" has reached the "maximum learning number" corresponding to "ALL", it indicates that correspondence relationships have been learned in all the entries (19000 entries) of the MAC learning table 12. The "priority" is a predetermined priority for each VLAN. In the "priority" item, "high" indicates that a VLAN has the highest priority, "low" indicates that a VLAN has the lowest priority, and "medium" indicates that the priority of a VLAN lies somewhere between the "high" and the "low" priorities. The "aging timer value" is a value indicating a retention period during which a correspondence relationship including a VLAN ID will be retained in the MAC learning table 12. Among the correspondence relationships stored in the MAC learning table 12, a correspondence relationship whose aging value has reached the aging timer value is deleted.

For example, a first entry of the learning management table 13 illustrated in FIG. 5 indicates that the current learning number, the minimum learning number, the maximum learning number, the priority, and the aging timer value of a correspondence relationship including "#1" as the VLAN ID are "6000", "5000", "8000", "high", and "10", respectively. A second entry of the learning management table 13 illustrated in FIG. 5 indicates that the current learning number, the minimum learning number, the maximum learning number, the priority, and the aging timer value of a correspondence relationship including "#2" as the VLAN ID are "6000", "4000", "6000", "medium", and "10", respectively. A third entry of the learning management table 13 illustrated in FIG. 5 indicates that the current learning number, the minimum learning number, the maximum learning number, the priority, and the aging timer value of a correspondence relationship including "#3" as the VLAN ID are "7000", "3000", "5000", "low", and "5", respectively. Note that, in the example of FIG. 5, a state where the total of current learning numbers 19000 for all VLANs has reached the total of maximum learning numbers 19000 for all VLANs is illustrated. The state indicates that correspondence relationships have been learned in all the entries (19000 entries) of the MAC learning table 12. In other words, the state indicates that all the entries of the MAC learning table 12 have been exhausted.

Returning now to FIG. 3, when a frame is received, the learning number determination unit 14 determines whether the total of current learning numbers has reached the total of maximum learning numbers, with reference to the learning management table 13. For example, it is assumed that the port P4 has received a frame in which the source address is the MAC address "D" and the VLAN ID is "#1", and the frame analysis unit 15a described later has output "#1" extracted as a reception VLAN ID from the frame, and so on to the learning number determination unit 14.

In this case, with reference to the learning management table 13, the learning number determination unit 14 determines that the total of current learning numbers 19000 for all VLANs has reached the total of maximum learning numbers 19000 for all VLANs. Then, the learning number determination unit 14 outputs a determination result indicating that all the entries of the MAC learning table 12 have been exhausted, to a VLAN identification unit 15b described later.

If the total of current learning numbers has not reached the total of the maximum learning numbers, the learning number determination unit 14 performs the following processing. That is, the learning number determination unit 14 outputs a determination result indicating that there is a blank entry in the MAC learning table 12, to the VLAN identification unit 15b and a storage controller 15c described later.

The controller 15 is a control unit that performs address learning based on a determination result provided by the learning number determination unit 14. The controller 15 includes the frame analysis unit 15a, the VLAN identification unit 15b, the storage controller 15c, and an aging controller 15d. The controller 15 may have an internal memory for storing control programs, programs defining various processing procedures, and various data.

Upon receipt of a frame, the frame analysis unit 15a analyzes the source address of the frame, the reception VLAN ID contained in the frame, and the port number of a port at which the frame has been received, and outputs the analyzed information and the frame to the VLAN identification unit 15b. For example, when receiving a frame in which the source address is the MAC address "D" and the VLAN ID is "#1", from the port P4, the frame analysis unit 15a analyzes the MAC address "D" as the source address and "#1" as the reception VLAN ID. Then, the frame analysis unit 15a analyzes "4" as the port number of the port P4 at which the frame has been received. Then, the frame analysis unit 15a outputs the analyzed MAC address "D", VLAN ID "#1", and port number "4", and the received frame to the VLAN identification unit 15b. Note that the frame analysis unit 15a outputs "#1" analyzed as the reception VLAN ID to the learning number determination unit 14.

If the total of current learning numbers in the MAC learning table 12 has reached the total of the maximum learning numbers, the VLAN identification unit 15b identifies, in the learning management table 13, a contented VLAN ID associated with a lower priority than a priority associated with the reception VLAN ID. The contented VLAN ID is a VLAN ID that is associated with a current learning number not less than the associated minimum learning number. In particular, if the total of current learning numbers of the MAC learning table 12 has reached the total of maximum learning numbers, the VLAN identification unit 15b determines whether the current learning number stored in the learning management table 13 in association with the reception VLAN ID has reached the associated minimum learning number. If it is determined that the minimum learning number has been reached, the VLAN identification unit 15b identifies a contented VLAN ID associated with a lower priority than a priority associated with the reception VLAN ID, in the learning management table 13, and outputs information on the contented VLAN ID to the storage controller 15c.

For example, it is assumed that the learning number determination unit 14 that has determined that the total of current learning numbers ALL=19000 has reached the total of maximum learning numbers ALL=19000 outputs, to the VLAN identification unit 15b, a determination result indicating that all the entries of the MAC learning table 12 have been exhausted. Also, for example, it is assumed that the frame analysis unit 15a outputs, to the VLAN identification unit 15b, a MAC address "D", a VLAN ID "#1", and a port number "4" analyzed from a reception frame. In this case, with reference to the learning management table 13, the VLAN identification unit 15b determines that a learning number "6000" associated with "#1" as the reception VLAN ID has reached a minimum learning number "5000". Then, the VLAN identification unit 15b identifies other VLANs, VLAN#2 and VLAN#3, that have lower priorities than a priority of VLAN#1 and whose current learning numbers have reached their minimum learning numbers. Thereafter, the VLAN identification unit 15*b* outputs the VLAN ID "#3" of VLAN#3, which has the lowest priority of the identified other VLANs VLAN#2 and VLAN#3, and information such as the analyzed MAC address "D", VLAN ID "#1", and port number "4" to the storage controller 15*c*.

If it is determined that the current learning number stored in the learning management table 13 in association with the reception VLAN ID has not reached the associated minimum learning number, the VLAN identification unit 15*b* identifies a contented VLAN ID, that is, a VLAN ID associated with a current learning number not less than the associated minimum learning number, in the learning management table 13. Then, the VLAN identification unit 15*b* outputs the contented VLAN ID and information such as the source address of the frame received from the frame analysis unit 15*a*, to the storage controller 15*c*.

If a VLAN ID associated with a lower priority than a priority associated with the reception VLAN ID is not identified in the learning management table 13, or if a VLAN ID associated with a current learning number not less than the associated minimum learning number is not identified in the learning management table 13, the VLAN identification unit 15*b* performs the following processing. That is, the VLAN identification unit 15*b* directly transfers the frame received from the frame analysis unit 15*a* to the storage controller 15*c*.

If the total of current learning numbers of the MAC learning table 12 has not reached the total of maximum learning numbers, the VLAN identification unit 15*b* outputs information such as the source address of the frame received from the frame analysis unit 15*a*, to the storage controller 15*c*. For example, upon receipt from the learning number determination unit 14 of a determination result indicating that there is a blank entry in the MAC learning table 12, the VLAN identification unit 15*b* directly outputs information such as the source address of the frame received from the frame analysis unit 15*a* to the storage controller 15*c*.

The storage controller 15*c* stores a correspondence relationship among the port number of a port at which the frame has been received, the source address of the frame, and the reception VLAN ID, in place of a correspondence relationship including the contented VLAN ID identified by the VLAN identification unit 15*b*, in the MAC learning table 12. For example, it is assumed that the storage controller 15*c* receives a contented VLAN ID "#3" of VLAN#3 as a contented VLAN that has a lower priority than VLAN#1 as a VLAN (referred to as a reception VLAN) having the reception VLAN ID, and information such as a MAC address "D", a VLAN ID "#1", and a port number "4" from the VLAN identification unit 15*b*.

In this case, the storage controller 15*c* deletes a correspondence relationship including the contented VLAN ID "#3" identified by the VLAN identification unit 15*b*, that is, a correspondence relationship of the port number "3", the MAC address "E", and the VLAN ID "#3" from the MAC learning table 12. Here, if there are a plurality of correspondence relationships each including the contented VLAN ID "#3" in the MAC learning table 12, the storage controller 15*c* may delete a correspondence relationship having the largest aging value among the plurality of correspondence relationships each including the contented VLAN ID "#3". Then, the storage controller 15*c* stores a correspondence relationship of the port number "4", the MAC address "D", and the VLAN ID "#1" in a blank entry obtained by deletion of the correspondence relationship from the MAC learning table 12. As a result, if a frame is received from a VLAN having a high priority under the condition that the total number of addresses has reached the associated maximum number, the storage controller 15*c* is able to learn information such as the source address of the frame in such a way that information on a VLAN that has a lower priority and whose minimum learning number has been reached is overwritten with the learned information.

As for another example, it is assumed that the storage controller 15*c* receives information such as the source address from the VLAN identification unit 15*b* and a contented VLAN ID, that is, a VLAN ID that is associated with a current learning number not less than the associated minimum learning number. In this case, the storage controller 15*c* deletes a correspondence relationship including the contented VLAN ID identified by the VLAN identification unit 15*b*, from the MAC learning table 12. If there are a plurality of correspondence relationships each including the contented VLAN ID in the MAC learning table 12, the storage controller 15*c* may delete a correspondence relationship having the largest aging value among the plurality of correspondence relationships each including the contented VLAN ID. Then, the storage controller 15*c* stores information such as the source address in the blank entry obtained by deletion of the correspondence relationship from MAC learning table 12. As a result, if a frame is received under the condition that the total number of addresses has reached the associated maximum number and if the current learning number corresponding to the reception VLAN ID has not reached the associated minimum learning number, the storage controller 15*c* is able to learn information such as the source address in such a way that information on a contented VLAN whose minimum learning number has been reached is overwritten with the learned information.

If the VLAN ID of a contented VLAN is not identified in the learning management table 13 by the VLAN identification unit 15*b*, the storage controller 15*c* does not learn the information such as the source address received from the VLAN identification unit 15*b*, and outputs the received information to the switching controller 16.

If the total of current learning numbers of the MAC learning table 12 has not reached the total of maximum learning numbers, that is, a determination result indicating that there is a blank entry in the MAC learning table 12 is received from the learning number determination unit 14, the storage controller 15*c* performs the following processing. That is, the storage controller 15*c* stores the port number, source address, and reception VLAN ID received from the VLAN identification unit 15*b* in association with one another in a blank entry of the MAC learning table 12.

Having stored information such as the source address received from the VLAN identification unit 15*b* in the MAC learning table 12, the storage controller 15*c* outputs the received information to the switching controller 16.

Figure 6:
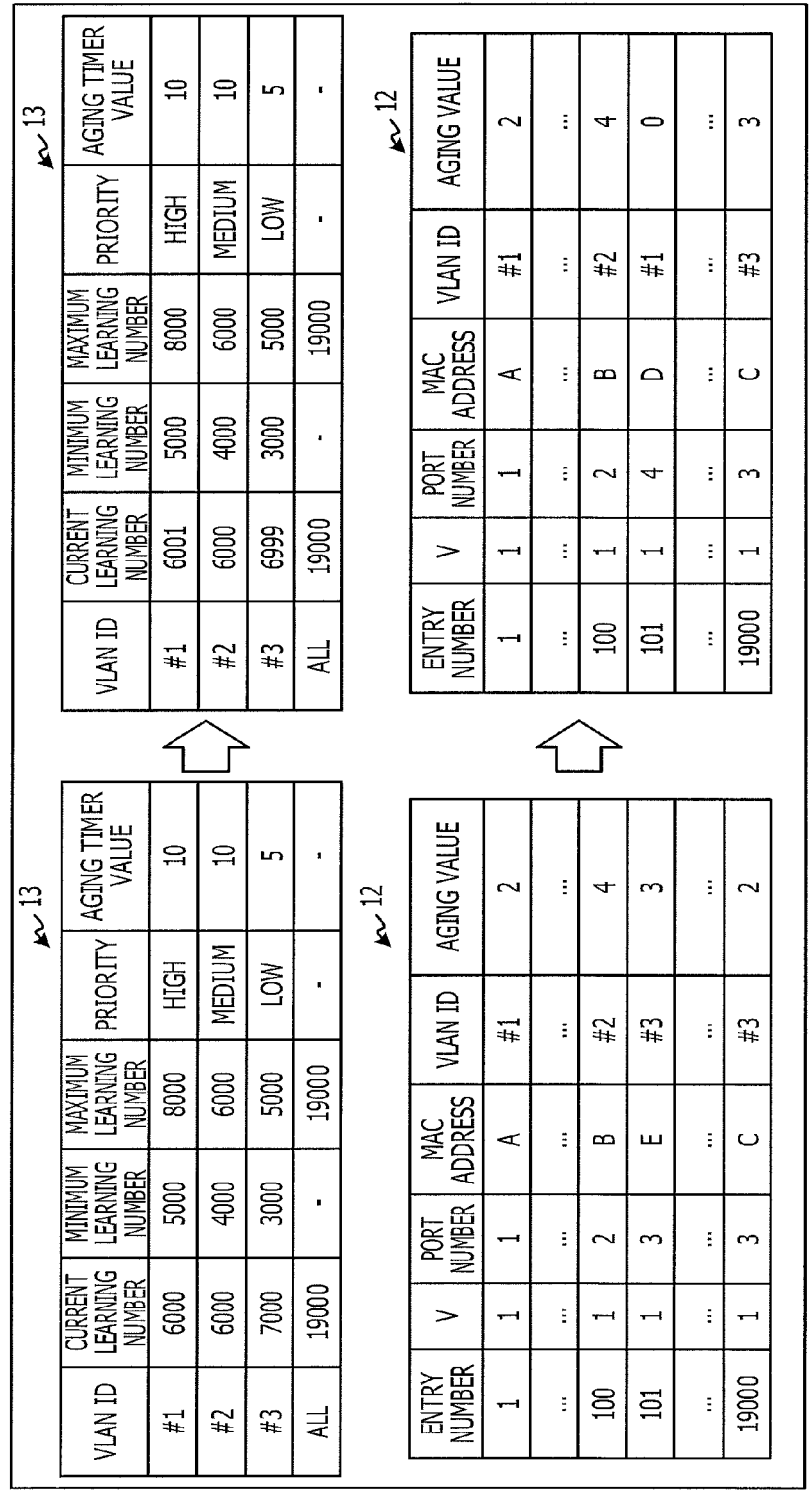
FIG. 6 is an illustration for explaining an example of processing performed by a VLAN identification unit and a storage controller in the embodiment.

Here, an example of processing performed by the VLAN identification unit 15*b* and the storage controller 15*c* is described. FIG. 6 is an illustration for explaining an example of processing performed by the VLAN identification unit 15*b* and the storage controller 15*c* in the present embodiment. With reference to FIG. 6, an example where if a frame is received from a VLAN having a high priority under the condition that the total number of addresses has reached the associated maximum number, information such as the source address of the frame is learned in such a way that information on a VLAN having a lower priority and whose minimum learning number has been reached is overwritten with the learned information will be described.

For example, it is assumed that, as illustrated in a table on the left side at the bottom of FIG. 6, the MAC learning table 12 stores a correspondence relationship of a port number "3", a MAC address "E", and a VLAN ID "#3" in an entry having an entry number "101". Also, it is assumed that, as illustrated in a table on the left side at the top of FIG. 6, the learning management table 13 stores the total of current learning numbers ALL=19000 and the total of maximum learning numbers ALL=19000. Also, it is assumed that, with reference to the learning management table 13, the learning number determination unit 14 determines that the total of current learning numbers ALL=19000 has reached the total of maximum learning numbers ALL=19000 and outputs a determination result indicating that all the entries of the MAC learning table 12 have been exhausted, to the VLAN identification unit 15b. Also, it is assumed that, when receiving, from the port P4, a frame whose source address is a MAC address "D" and whose VLAN ID is "#1", the frame analysis unit 15a outputs the analyzed MAC address "D", the VLAN ID "#1", and the port number "4" to the VLAN identification unit 15b. In this case, with reference to the learning management table 13, the VLAN identification unit 15b determines that the current learning number "6000" associated with "#1" as the reception VLAN ID has reached the minimum learning number "5000". Then, the VLAN identification unit 15b identifies contented VLANs, VLAN#2 and VLAN#3, each of which has a lower priority than a priority of VLAN#1. The contented VLANs are VLANs whose current learning numbers have reached their respective minimum learning numbers. Thereafter, the VLAN identification unit 15b outputs the VLAN ID "#3" of VLAN#3 having the lowest priority between VLAN#2 and VLAN#3 identified as the contented VLANs, and the analyzed information such as the MAC address "D", the VLAN ID "#1", and the port number "4" to the storage controller 15c.

The storage controller 15c receives the contented VLAN ID "#3" of VLAN#3 as the contented VLAN that has a lower priority than the priority of VLAN#1 as the reception VLAN, and the information such as the MAC address "D", the VLAN ID "#1", and the port number "4" from the VLAN identification unit 15b. Then, the storage controller 15c deletes a correspondence relationship including the contented VLAN ID "#3" identified by the VLAN identification unit 15b, that is, the correspondence relationship of the port number "3", the MAC address "E", and the VLAN ID "#3" is deleted from the entry having the entry number "101" of the MAC learning table 12. At this point, there are a plurality of correspondence relationships each including the contented VLAN ID "#3" in the MAC learning table 12, and therefore the storage controller 15c deletes a correspondence relationship having the largest aging value among the plurality of correspondence relationships each including the contented VLAN ID "#3". Then, as illustrated in a table on the right side at the bottom of FIG. 6, the storage controller 15c stores a correspondence relationship of the port number "4", the MAC address "D", and the VLAN ID "#1" in a blank entry obtained by deletion of the correspondence relationship from MAC learning table 12. Additionally, the storage controller 15c stores an aging value="0" as an initial value of the elapsed time of the correspondence relationship of the port number "4", the MAC address "D", and the VLAN ID "#1". As a result, if a frame is received from a VLAN having a high priority under the condition that the total number of addresses has reached the maximum number, the storage controller 15c is able to learn information such as the source address of the frame in such a way that information on a VLAN that has a lower priority and whose minimum learning number has been reached is overwritten with the learned information.

Subsequently, as illustrated in a table on the right side at the top of FIG. 6, the storage controller 15c updates the current learning numbers in the learning management table 13. That is, the storage controller 15c decrements the current learning number associated with the VLAN ID "#3" of the contented VLAN included in the correspondence relationship deleted from the entry having the entry number "101", and increments the current learning number associated with the VLAN ID "#1" of the reception VLAN included in the correspondence relationship newly stored in the blank entry having the entry number "101".

FIG. 7 is an illustration for explaining an example of processing performed by the VLAN identification unit 15b and the storage controller 15c in the present embodiment. With reference to FIG. 7, an example where if a frame is received under the condition that the total number of addresses has reached the maximum number and if the current learning number associated with the reception VLAN ID has not reached the associated minimum learning number, information such as the source address is learned in such a way that information on a contented VLAN whose current learning number has reached the associated minimum learning number is overwritten with the learned information will be described.

For example, it is assumed that, as illustrated in a table on the left side at the bottom of FIG. 7, the MAC learning table 12 stores a correspondence relationship of a port number "2", a MAC address "F", and a VLAN ID "#2" in an entry having an entry number "101". Also, it is assumed that, as illustrated in a table on the left side at the top of FIG. 7, the learning management table 13 stores the total of current learning numbers ALL=19000 and the total of maximum learning numbers ALL=19000. Also, it is assumed that, with reference to the learning management table 13, the learning number determination unit 14 determines that the total of current learning numbers ALL=19000 has reached the total of maximum learning numbers ALL=19000, and outputs a determination result indicating that all the entries of the MAC learning table 12 have been exhausted, to the VLAN identification unit 15b. Also, it is assumed that, when receiving, from the port P3, a frame whose source address is a MAC address "E" and whose VLAN ID is "#3", the frame analysis unit 15a outputs the MAC address "E", the VLAN ID "#3", and the port number "3" analyzed from the frame to the VLAN identification unit 15b. In this case, with reference to the learning management table 13, the VLAN identification unit 15b determines that a learning number "2000" associated with "#3" as the reception VLAN ID has not reached a minimum learning number "3000". Then, the VLAN identification unit 15b identifies contented VLANs VLAN#1 and VLAN#2, whose current learning numbers have reached their respective minimum learning numbers. Thereafter, the VLAN identification unit 15b outputs the VLAN ID "#2" of VLAN#2, which is a contented VLAN that has the lowest priority between VLAN#1 and VLAN#2 identified as contented VLANs, and the analyzed information such as the MAC address "E", the VLAN ID "#3", and the port number "3" to the storage controller 15c.

The storage controller 15c receives the contented VLAN ID "#2" of VLAN#2 as the contented VLAN, and the information such as the MAC address "E", the VLAN ID "#3", and the port number "3" from the VLAN identification unit 15b. Then, the storage controller 15c deletes a correspondence relationship including the contented VLAN ID "#2" identified by the VLAN identification unit 15*b*, that is, the correspondence relationship of the port number "2", the MAC address "F", and the VLAN ID "#2" is deleted from the entry having the entry number "101" in the MAC learning table 12. At this point, there are a plurality of correspondence relationships each including the contented VLAN ID "#2" in the MAC learning table 12, and therefore the storage controller 15*c* deletes a correspondence relationship having the largest aging value among the plurality of correspondence relationships each including the contented VLAN ID "#2". Then, as illustrated in a table on the right side at the bottom of FIG. 7, the storage controller 15*c* stores a correspondence relationship of the port number "3", the MAC address "E", and the VLAN ID "#3" in a blank entry having the entry number "101" obtained by deletion of the correspondence relationship from MAC learning table 12. As a result, if a frame is received under the condition that the total number of addresses has reached the maximum number, the storage controller 15*c* is able to learn information such as the source address in such a way that information on a VLAN whose current learning number has reached the associated minimum learning number is overwritten with the learned information.

Subsequently, as illustrated in a table on the right side at the top of FIG. 7, the storage controller 15*c* updates the current learning numbers in the learning management table 13. That is, the storage controller 15*c* decrements the current learning number associated with the contented VLAN ID "#2" included in the correspondence relationship deleted from the entry having the entry number "101", and increments the current learning number associated with the VLAN ID "#3" of the reception VLAN included in the correspondence relationship newly stored in the blank entry having the entry number "101".

Figure 8:
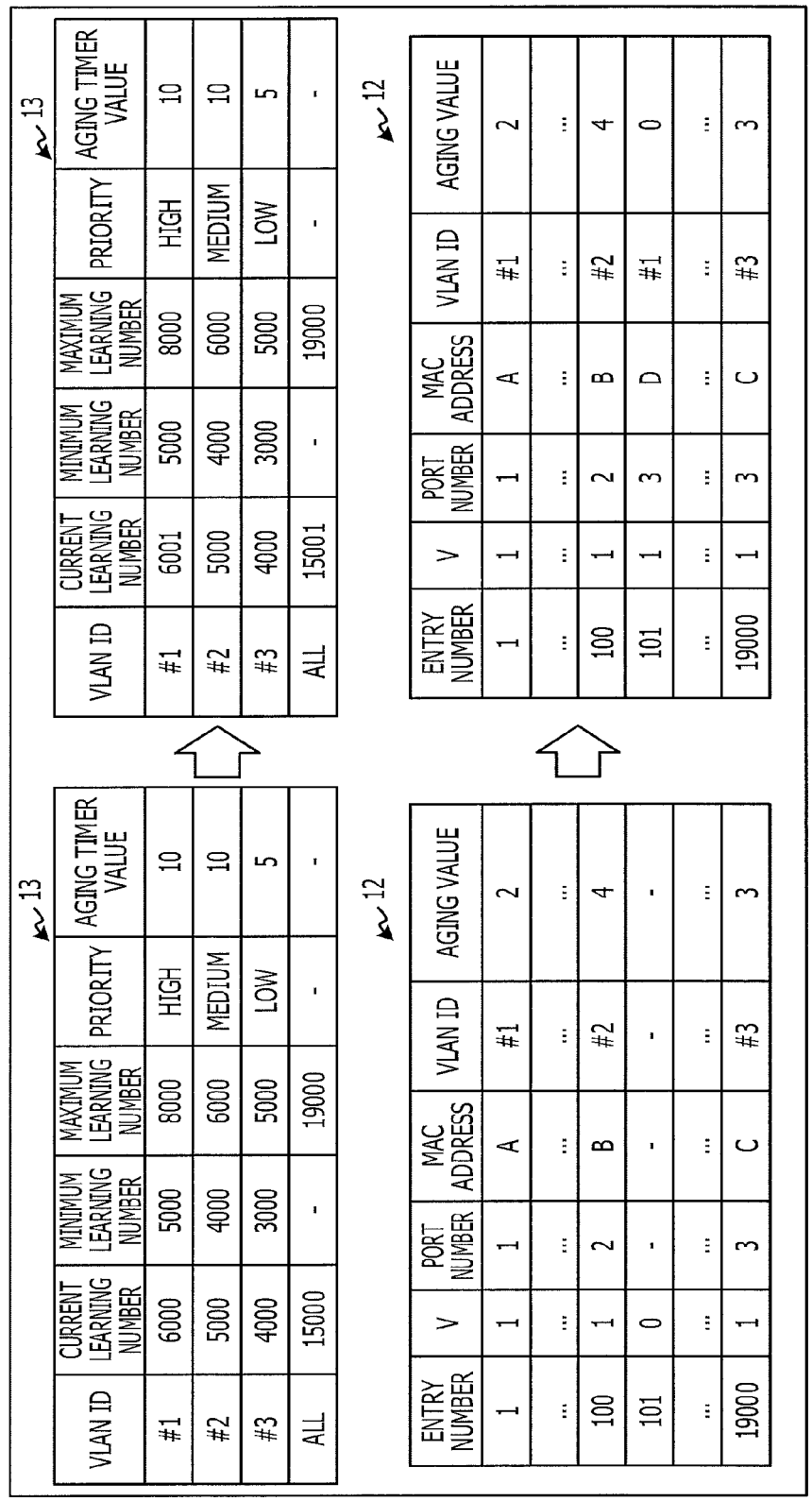
FIG. 8 is an illustration for explaining an example of processing performed by the VLAN identification unit and the storage controller in the embodiment.

FIG. 8 is an illustration for explaining an example of processing performed by the VLAN identification unit 15*b* and the storage controller 15*c* in the present embodiment. With reference to FIG. 8, an example where if a frame is received under the condition that the total number of addresses has not reached the maximum number, information such as the source address of the received frame is learned will be described.

For example, it is assumed that, as illustrated in a table on the left side at the bottom of FIG. 8, the MAC learning table 12 does not store a correspondence relationship in an entry having an entry number "101". Also, it is assumed that, as illustrated in a table on the left side at the top of FIG. 8, the learning management table 13 stores the total of current learning numbers ALL=15000 and the total of maximum learning numbers ALL=19000. Also, it is assumed that the learning number determination unit 14 determines, with reference to the learning management table 13, that the total of current learning numbers ALL=15000 has not reached the total of maximum learning numbers ALL=19000, and outputs a determination result indicating that there is a blank entry in the MAC learning table 12, to the VLAN identification unit 15*b*. Also, it is assumed that, when receiving, from the port P3, a frame whose source address is a MAC address "D" and whose VLAN ID is "#1", the frame analysis unit 15*a* outputs the MAC address "D", the VLAN ID "#1", and the port number "3" analyzed from the frame to the VLAN identification unit 15*b*. In this case, the VLAN identification unit 15*b* receives, from the learning number determination unit 14, the determination result indicating that there is a blank entry in the MAC learning table 12. The VLAN identification unit 15*b* directly outputs information such as the source address of the frame received from the frame analysis unit 15*a* to the storage controller 15*c*.

The storage controller 15*c* receives information such as the MAC address "D", the VLAN ID "#1", and the port number "3" from the VLAN identification unit 15*b*. The storage controller 15*c* also receives, from the learning number determination unit 14, a determination result indicating that there is a blank entry in the MAC learning table 12. Then, as illustrated in a table on the right side at the bottom of FIG. 8, the storage controller 15*c* stores a correspondence relationship of the port number "3", the MAC address "D", and the VLAN ID "#1" in the blank entry having the entry number "101" of the MAC learning table 12. As a result, if a frame is received under the condition that the total number of addresses has not reached the maximum number, the storage controller 15*c* is able to learn information such as the source address of the received frame.

Subsequently, as illustrated in a table on the right side at the top of FIG. 8, the storage controller 15*c* updates the current learning numbers in the learning management table 13. That is, the storage controller 15*c* increments the current learning number associated with the reception VLAN ID "#1" included in the correspondence relationship newly stored in the blank entry having the entry number "101" and the total of current learning numbers ALL.

Returning now to FIG. 3, each time a predetermined period has arrived, the aging controller 15*d* determines whether an aging value related to a correspondence relationship stored in the MAC learning table 12 has reached an aging timer value stored in the learning management table 13 in association with a VLAN ID included in the correspondence relationship. If there is a correspondence relationship for which the aging value related to the correspondence relationship has reached the aging timer value associated with the VLAN ID included in the correspondence relationship, the aging controller 15*d* deletes the correspondence relationship from the MAC learning table 12. Thereafter, the aging controller 15*d* determines whether the current learning number stored in the learning management table 13 in association with the VLAN ID included in the deleted correspondence relationship is not less than the minimum learning number. If it is determined that the current learning number stored in association with the VLAN ID included in the deleted correspondence relationship is less than the minimum learning number, the aging controller 15*d* extends an aging timer value stored in the learning management table 13 in association with the VLAN ID.

If it is determined that the current learning number stored in association with the VLAN ID included in the deleted correspondence relationship is not less than the minimum learning number, the aging controller 15*d* determines whether the current learning number stored in association with the VLAN ID included in the deleted correspondence relationship has exceeded the maximum learning number. If it is determined that the current learning number stored in association with the VLAN ID included in the deleted correspondence relationship has exceeded the maximum learning number, the aging controller 15*d* shortens the aging timer value stored in the learning management table 13 in association with the VLAN ID.

If it is determined that the current learning number stored in association with the VLAN ID included in the deleted correspondence relationship has not exceeded the maximum learning number, the aging controller 15*d* upholds the aging timer value stored in the learning management table 13.

Figure 9:
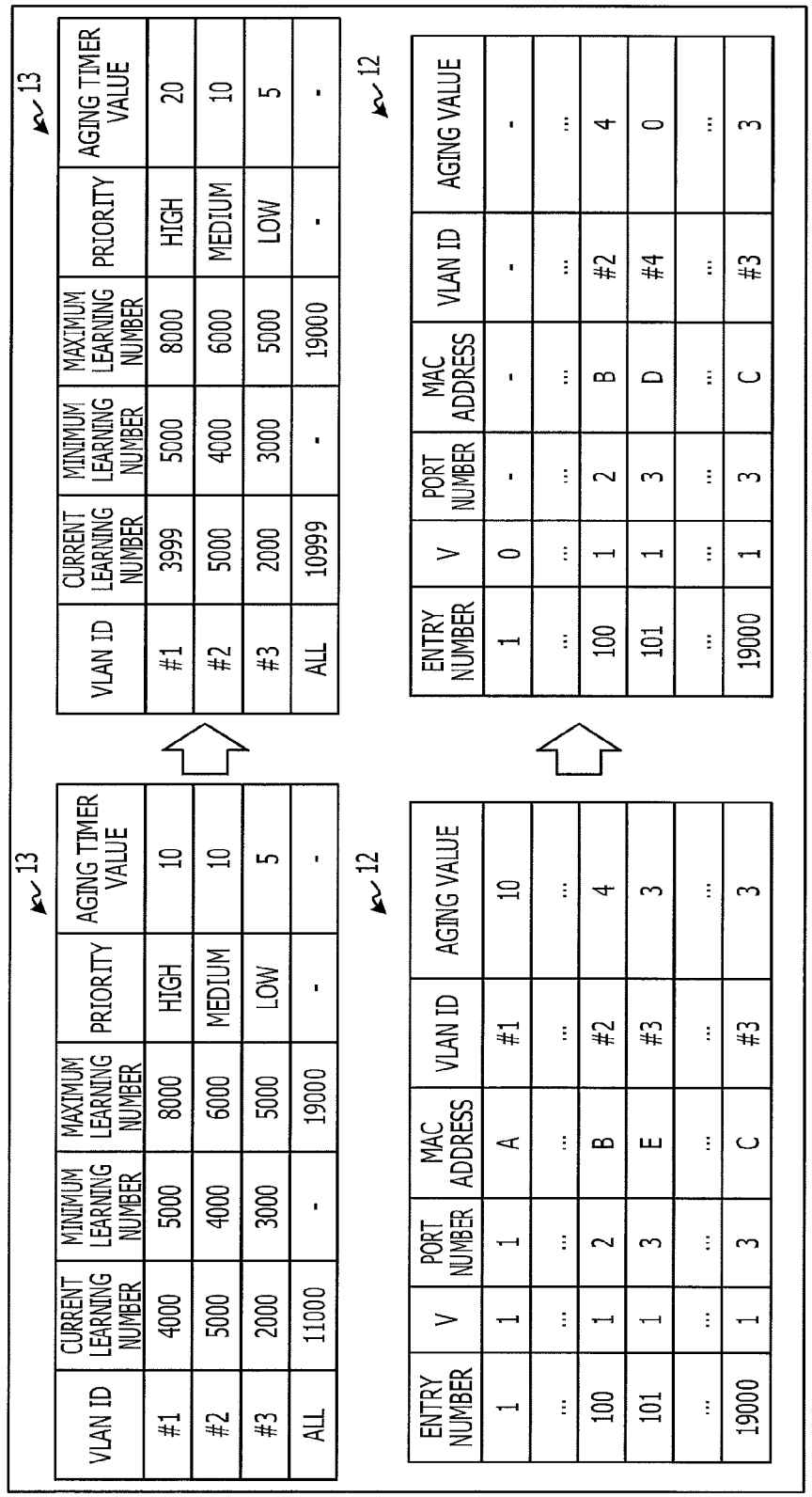
FIG. 9 is an illustration for explaining an example of processing performed by an aging controller in the embodiment.

Here, an example of processing performed by the aging controller 15d is described. FIG. 9 is an illustration for explaining an example of processing performed by the aging controller 15d in the present embodiment. With reference to FIG. 9, an example where an aging timer value stored in the learning management table 13 is extended is described.

For example, it is assumed that, as illustrated in a table on the left side at the bottom of FIG. 9, the MAC learning table 12 stores a correspondence relationship of a port number "1", a MAC address "A", and a VLAN ID "#1", and an aging value=10 in an entry having an entry number "1". Also, it is assumed that, as illustrated in a table on the left side at the top of FIG. 9, the learning management table 13 stores an aging timer value=10 in association with the VLAN ID "#1". In this case, with reference to the MAC learning table 12, the aging controller 15d determines that the aging value=10 related to the correspondence relationship including the VLAN ID "#1" has reached the aging timer value=10 stored in the learning management table 13 in association with the VLAN ID "#1" included in the correspondence relationship. Then, the aging controller 15d deletes the correspondence relationship including the VLAN ID "#1" from the MAC learning table 12 as illustrated in a table on the right side at the bottom of FIG. 9. Thereafter, the aging controller 15d determines that a learning number "4000" stored in the learning management table 13 in association with the VLAN ID "#1" included in the deleted correspondence relationship has not reached the minimum learning number "5000". Then, the aging controller 15d extends the aging timer value stored in the learning management table 13 in association with the VLAN ID "#1" from "10" to "20" as illustrated in a table on the right side at the top of FIG. 9. As a result, at the time of deleting an address for which a retention period has been reached, from the learned addresses, the aging controller 15d is able to dynamically extend the retention period of the address in accordance with a deficiency of the current learning number.

Figure 10:
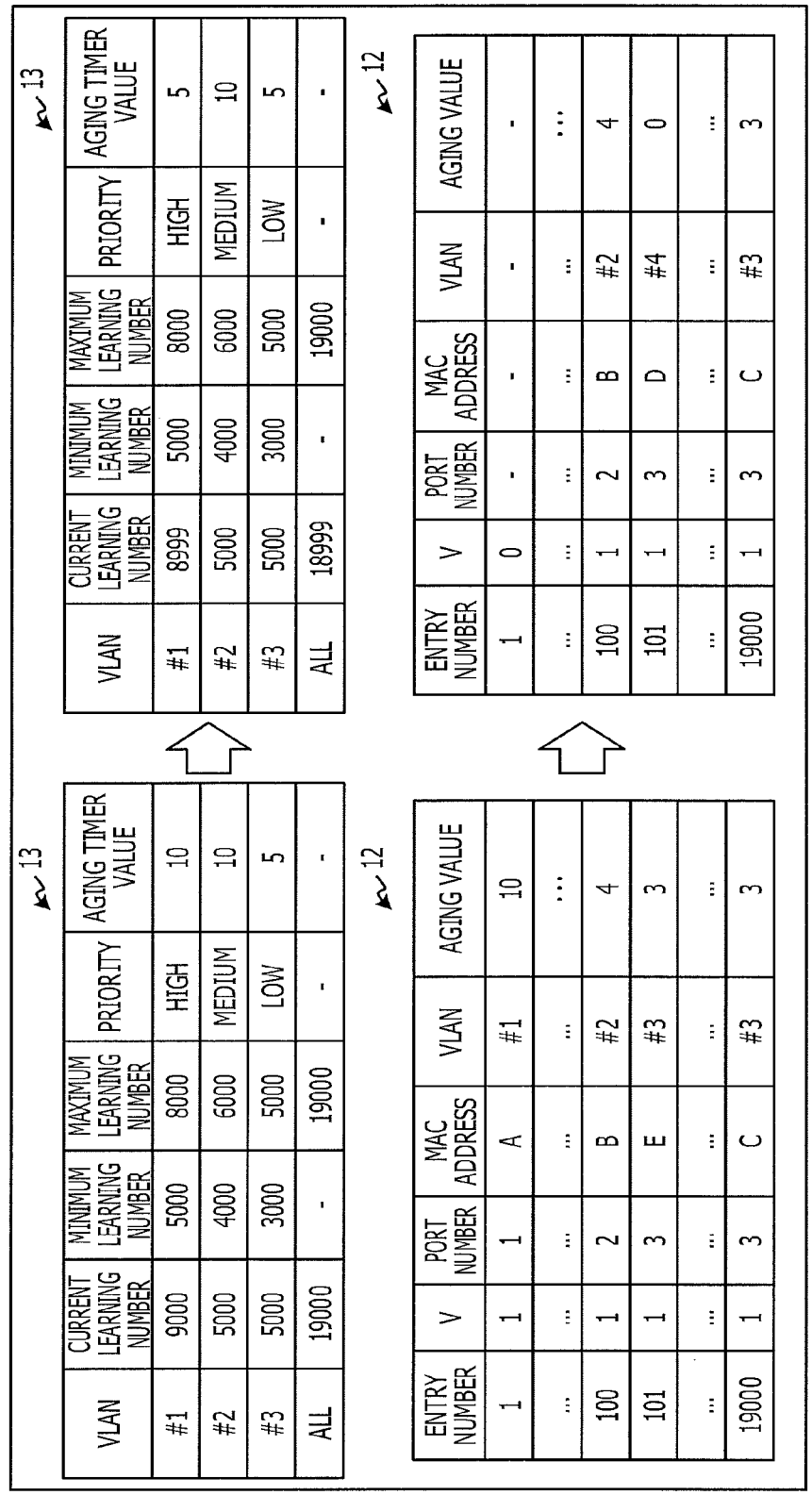
FIG. 10 is an illustration for explaining an example of processing performed by the aging controller in the embodiment.

FIG. 10 is an illustration for explaining an example of processing performed by the aging controller 15d in the present embodiment. With reference to FIG. 10, an example where an aging timer value stored in the learning management table 13 is shortened will be described.

For example, it is assumed that, as illustrated in a table on the left side at the bottom of FIG. 10, the MAC learning table 12 stores a correspondence relationship of a port number "1", a MAC address "A", and a VLAN ID "#1", and an aging value=10 in an entry having an entry number "1 ". Also, it is assumed that, as illustrated in a table on the left side at the top of FIG. 10, the learning management table 13 stores an aging timer value=10 in association with the VLAN ID "#1". In this case, with reference to the MAC learning table 12, the aging controller 15d determines that the aging value=10 related to the correspondence relationship including the VLAN ID "#1" has reached the aging timer value=10 stored in the learning management table 13 in association with the VLAN ID "#1" included in the correspondence relationship. Then, the aging controller 15d deletes the correspondence relationship including the VLAN ID "#1" from the MAC learning table 12 as illustrated in a table on the right side at the bottom of FIG. 10. Thereafter, the aging controller 15d determines that a learning number "9000" stored in the learning management table 13 in association with the VLAN ID "#1" included in the deleted correspondence relationship has exceeded the maximum learning number "8000". Then, the aging controller 15d shortens the aging timer value stored in the learning management table 13 in association with the VLAN ID "#1" from "10" to "5" as illustrated in a table on the right side at the top of FIG. 10. As a result, at the time of deleting an address for which a retention period has been reached, from the learned addresses, the aging controller 15d is able to dynamically shorten the retention period for the address in accordance with an excess of the current learning number.

Returning now to FIG. 3, the switching controller 16 performs a frame switching process to transfer the received frame to the transmission destination. In particular, if the destination address of the frame received from the storage controller 15c has been learned, the switching controller 16 sends a frame from a port that has been learned. If the destination address of the frame received from the storage controller 15c has not been learned, the switching controller 16 discards or floods the frame.

For example, it is assumed that if a contented VLAN ID is not identified in the learning management table 13 by the VLAN identification unit 15b, the storage controller 15c outputs the received information such as the source address without learning it in the MAC learning table. In this case, with reference to the MAC learning table 12, in which the destination address of the frame is not stored, the switching controller 16 determines that the destination address of the frame has not been learned, and discards or floods the frame. When flooding a frame, the switching controller 16 sends the frame from all the ports other than a reception port at which the frame has been received.

Figure 11:
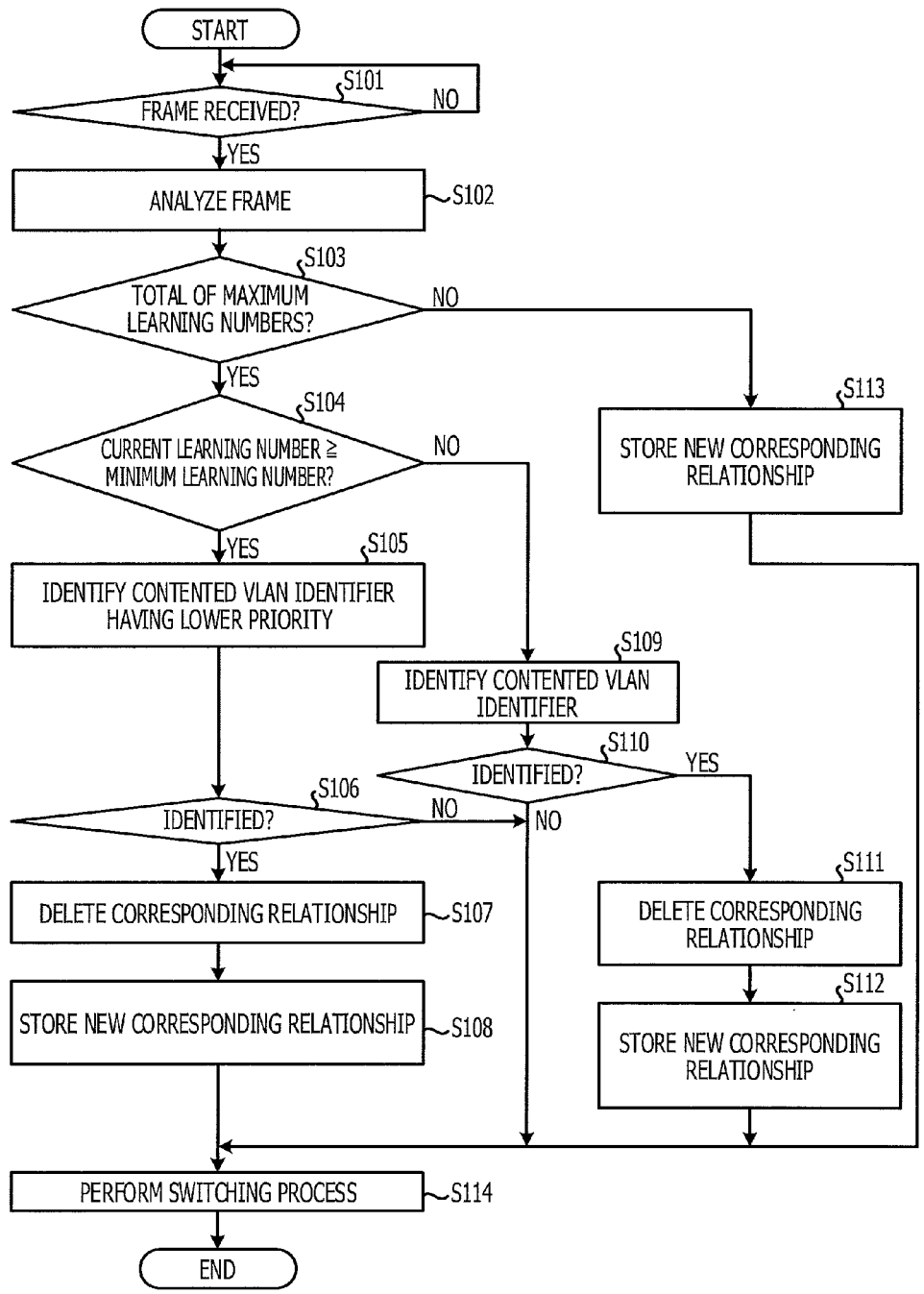
FIG. 11 is a flowchart illustrating a flow of an address learning process performed by a switch according to the embodiment.

Next, the flow of an address learning process performed by the switch 10 according to the present embodiment will be described. FIG. 11 is a flowchart illustrating a flow of an address learning process performed by the switch 10 according to the present embodiment. As illustrated in FIG. 11, if a frame is not received (No in S101), the frame analysis unit 15a of the switch 10 waits.

If a frame is received (Yes in S101), the frame analysis unit 15a analyzes a source address of the frame, a reception VLAN ID, and a port number of a reception port that has received the frame (S102). The frame analysis unit 15a outputs the analyzed information and the frame to processing units such as the VLAN identification unit 15b and the learning number determination unit 14.

With reference to the learning management table 13, the learning number determination unit 14 determines whether the total of current learning numbers has reached the total of maximum learning numbers (S103).

If the total of current learning numbers has reached the total of maximum learning numbers (Yes in S103), then the VLAN identification unit 15b determines whether the current learning number stored in the learning management table 13 in association with the reception VLAN ID has reached the associated minimum learning number (S104). If it is determined that the minimum learning number has been reached (Yes in S104), the VLAN identification unit 15b identifies, from the learning management table 13, a contented VLAN ID associated with a lower priority than a priority associated with the reception VLAN ID. The contented VLAN ID is a VLAN ID that is associated with a current learning number not less than the associated minimum learning number (S105).

If a contented VLAN ID associated with a lower priority than a priority associated with the reception VLAN ID is identified (Yes in S106), the storage controller 15c deletes a correspondence relationship including the contented VLAN ID from the MAC learning table 12 (S107). In a blank entry obtained by deletion of the correspondence relationship, the storage controller 15c stores a new correspondence relationship of the port number of the reception port, the source address, and the reception VLAN ID (S108), and then the process proceeds to S114.

If a contented VLAN ID associated with a lower priority than a priority associated with the reception VLAN ID is not identified (No in S106), the storage controller 15c does not perform the process of S107 and S108, and the process proceeds to S114.

If it is determined that the current learning number stored in the learning management table 13 in association with the reception VLAN ID has not reached the associated minimum learning number (No in S104), the VLAN identification unit 15b performs the process as follows. That is, the VLAN identification unit 15b identifies a contented VLAN ID, which is associated with a current learning number not less than the associated minimum learning number, in the learning management table 13 (S109).

If a contented VLAN ID is identified (Yes in S110), the storage controller 15c deletes a correspondence relationship including the contented VLAN ID from the MAC learning table 12 (S111). The storage controller 15c stores a new correspondence relationship of the port number of the reception port, the source address, and the reception VLAN ID in a blank entry obtained by the deletion of the correspondence relationship (S112), and then the process proceeds to S114.

If a contented VLAN ID is not identified (No in S110), the storage controller 15c does not perform the process of S111 and S112, and then the process proceeds to S114.

If the total of current learning numbers has not reached the total of maximum learning numbers (No in S103), then the VLAN identification unit 15b outputs information such as the source address of the received frame to the storage controller 15c. Then, the storage controller 15c stores a new correspondence relationship of the port number of the reception port, the source address, and the reception VLAN ID in a blank entry of the MAC learning table 12 (S113), and then the process proceeds to S114.

Thereafter, the switching controller 16 performs a switching process, and sends the frame to the destination (S114). That is, if the destination address of the frame received from the storage controller 15c has been learned, the switching controller 16 identifies a learned port in the MAC learning table 12, and sends the frame from the identified port. If the destination address of the frame received from the storage controller 15c has not been learned, the switching controller 16 discards or floods the frame.

Figure 12:
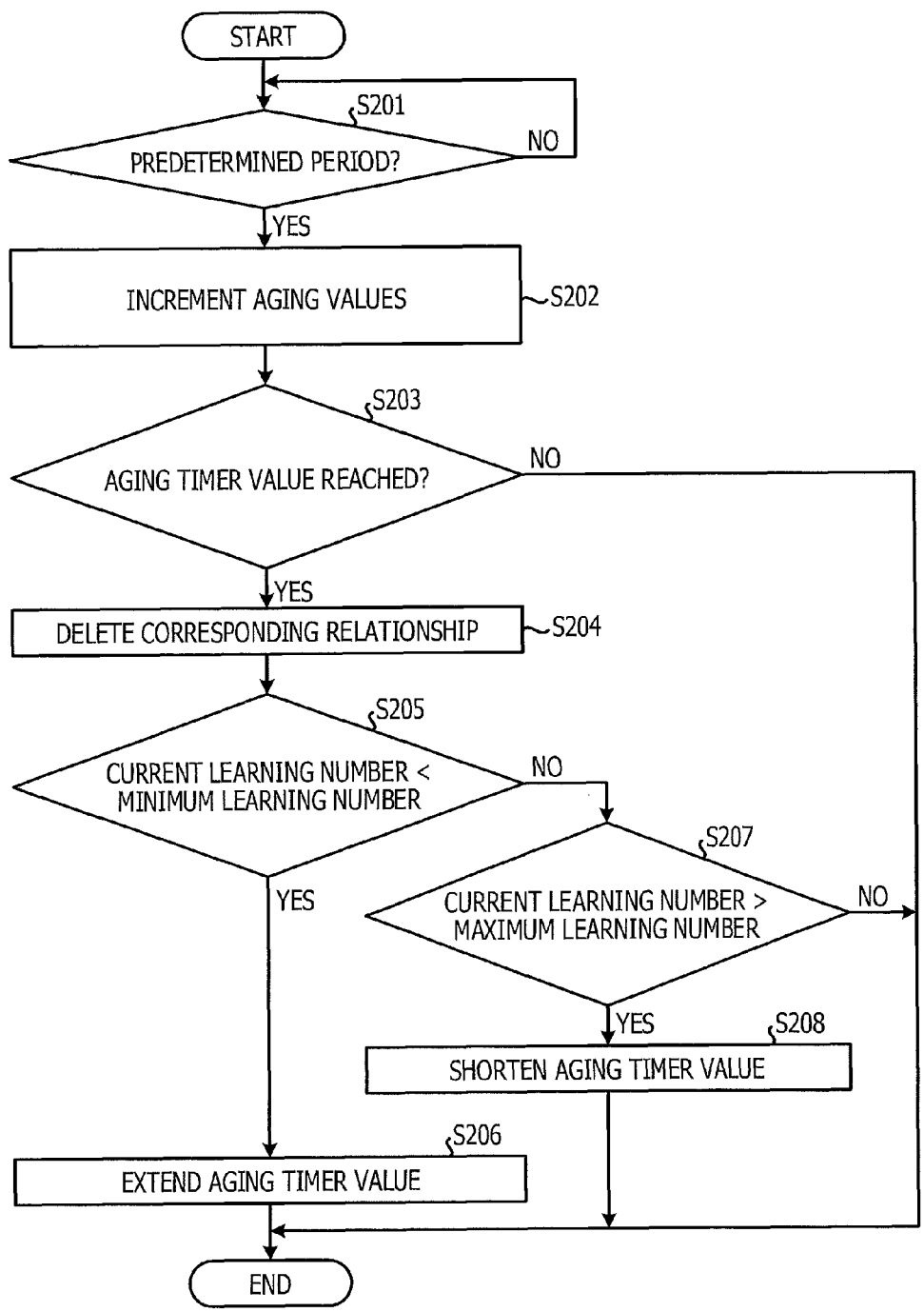
FIG. 12 is a flowchart illustrating a flow of an aging process performed by the switch according to the embodiment.

Next, the flow of an aging process performed by the switch 10 according to the present embodiment will be described. FIG. 12 is a flowchart illustrating a flow of an aging process performed by the switch 10 according to the present embodiment. As illustrated in FIG. 12, if a predetermined period has not been reached (No in S201), the aging controller 15d of the switch 10 waits.

If the predetermined period has been reached (Yes in S201), the aging controller 15d increments aging values related to respective correspondence relationships stored in the MAC learning table 12 (S202). Then, the aging controller 15d determines whether an aging value related to a correspondence relationship stored in the MAC learning table 12 has reached an aging timer value stored in the learning management table 13 in association with a VLAN ID included in the correspondence relationship (S203). If there is no correspondence relationship for which the aging value related to the correspondence relationship has reached the aging timer value associated with the VLAN ID included in the correspondence relationship (No in S203), the aging controller 15d terminates the process.

If there is a correspondence relationship for which the aging value related to the correspondence relationship has reached the aging timer value associated with the VLAN ID included in the correspondence relationship (Yes in S203), the aging controller 15d performs the process as follows. That is, the aging controller 15d deletes a correspondence relationship whose aging value has reached the aging timer value, from the MAC learning table 12 (S204).

Thereafter, the aging controller 15d determines whether the current learning number stored in the learning management table 13 in association with the VLAN ID included in the deleted correspondence relationship is less than the minimum learning number (S205). If it is determined that the minimum learning number is less than the minimum learning number (Yes in S205), the aging controller 15d extends the aging timer value stored in the learning management table 13 in association with the VLAN ID included in the deleted correspondence relationship (S206).

If it is determined that the current learning number stored in the learning management table 13 in association with the VLAN ID included in the deleted correspondence relationship is not less than the minimum learning number (No in S205), the aging controller 15d performs the process as follows. That is, the aging controller 15d determines whether the current learning number stored in the learning management table 13 in association with the VLAN ID included in the deleted correspondence relationship has exceeded the maximum learning number (S207).

If it is determined that the maximum learning number has been exceeded (Yes in S207), the aging controller 15d shortens the aging timer value stored in the learning management table 13 in association with the VLAN ID included in the deleted correspondence relationship (S208).

If the current learning number stored in the learning management table 13 in association with the VLAN ID included in the deleted correspondence relationship does not exceed the maximum learning number (No in S207), the aging controller 15d does not perform the process of S208 and terminates the process.

According to the present embodiment, when the total of current learning numbers has reached the total of maximum learning numbers during address learning upon receipt of a frame, the switch 10 identifies a VLAN ID associated with a lower priority than a priority associated with the reception VLAN ID contained in the frame, and associated with a current learning number not less than the associated minimum learning number. The switch 10 according to the present embodiment learns a correspondence relationship among a port number of a port at which the frame has been received, a source address of the frame, and a reception VLAN ID in such a way that a correspondence relationship including the contented VLAN ID is overwritten with the learned correspondence relationship. Accordingly, the switch 10 may learn information contained in a frame received from a VLAN having a relatively high priority while inhibiting information of a VLAN whose minimum learning number has not been reached from being deleted. As a result, the switch 10 may perform efficient address learning in accordance with priorities while securing a minimum number of learned correspondence relationships for each VLAN.

Also, if the current learning number stored in the learning management table 13 in association with a reception VLAN ID upon receipt of a frame has not reached the associated minimum learning number, the switch 10 identifies a contented VLAN ID that is associated with a current learning number not less than the associated minimum learning number. Then, the switch 10 learns a correspondence relationship among the port number of a port at which the frame has been received, the source address of the frame, and the reception VLAN ID, in place of a correspondence relationship including the contented VLAN ID. Accordingly, if the current learning number corresponding to the reception VLAN ID has not reached the associated minimum learning number, the switch 10 may learn information such as the source address in such a way that information on a VLAN whose minimum learning number has been reached is overwritten with the learned information. As a result, the switch 10 may learn information on a source VLAN to which the transmission source of a frame belongs, in preference to a VLAN having a higher priority than the source VLAN and whose minimum learning number has been reached, while securing a minimum number of learned correspondence relationships for the source VLAN.

If a VLAN ID associated with a lower priority than a priority associated with the reception VLAN ID is not identified upon receipt of a frame, or if a VLAN ID associated with a current learning number not less than the associated minimum learning number is not identified, the switch 10 discards or floods the frame without performing the learning. As a result, the switch 10 may avoid the situation where information on another VLAN whose priority is higher than the reception VLAN ID and information on another VLAN whose minimum learning number has not been reached are excessively deleted, and may stably secure a minimum number of learned correspondence relationships for each VLAN.

If the total of current learning numbers has not reached the total of maximum learning numbers during address learning upon receipt of a frame, the switch 10 stores a correspondence relationship among the port number, the source address, and the reception VLAN ID in a blank entry of the MAC learning table 12. As a result, the switch 10 is allowed to make effective use of a blank entry of the MAC learning table 12, and therefore may further improve the efficiency of address learning.

If the current learning number associated with a VLAN ID included in a correspondence relationship deleted at the time of aging has not reached the associated minimum learning number, the switch 10 extends an aging timer value stored in the learning management table 13 in association with the VLAN ID. As a result, at the time of deleting an address for which a retention period has been reached, the switch 10 may dynamically extend the retention period of the address in accordance with a deficiency of the current learning number.

If the current learning number associated with a VLAN ID included in a correspondence relationship deleted at the time of aging has exceeded the maximum learning number, the switch 10 shortens an aging timer value stored in the learning management table 13 in association with the VLAN ID. As a result, at the time of deleting an address for which a retention period has been reached, the switch 10 may dynamically shorten the retention period for the address in accordance with an excess of the current learning number.

Various kinds of processing described in the above embodiment may be implemented by executing a program provided in advance on a computer such as a personal computer or a workstation. Accordingly, an example of a computer that executes a program having the same functions as the above embodiment will be described below.

Figure 13:
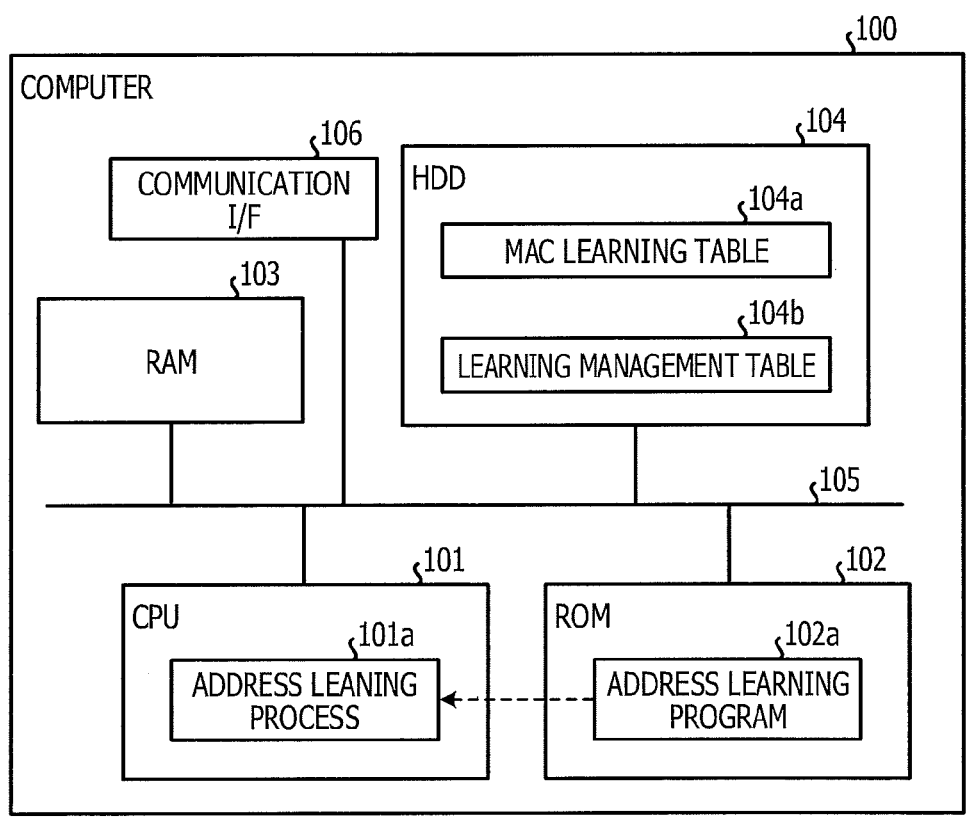
FIG. 13 is a block diagram illustrating an example of a computer that executes an address learning program.

FIG. 13 is a block diagram illustrating an example of a computer that executes an address learning program. As illustrated in FIG. 13, a computer 100 includes a central processing unit (CPU) 101, a read only memory (ROM) 102, a random access memory (RAM) 103, a hard disk drive (HDD) 104, and a communication interface (I/F) 106. The CPU 101, the ROM 102, the RAM 103, the HDD 104, and the communication I/F 106 are connected via a bus 105. A MAC learning table 104a and a learning management table 104b having the same functions as the tables illustrated in FIG. 3 are provided in the HDD 104. The communication I/F 106 is an interface for communicating with other devices.

The ROM 102 holds an address learning program 102a. Although the ROM 102 is mentioned as an example of a recording medium, various programs may be stored on another computer-readable recording medium such as an HDD, a RAM, or a compact disc (CD)-ROM and be read by a computer. Note that a storage medium may be arranged at a remote place, and a computer may access the storage medium so as to acquire and use the programs. In addition, at that time, the acquired program may be used in such a way as to be stored in a recording medium of the computer itself.

The CPU 101 reads and executes the address learning program 102a to operate the address learning process 101a for performing functions described with reference to FIG. 3. That is, the address learning process 101a performs the same functions as the controller 15. The address learning process 101a is capable of performing the same functions as the learning number determination unit 14 and the switching controller 16. In this way, the computer 100 operates as a communication device performing an address learning method by reading the program from the ROM 102 and executing it.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the present embodiment of the present invention has been described in detail, it should be understood that the various changes, substitutions, and alterations could be made hereto without departing from the spirit and scope of the invention.

What is claimed is:

1. A communication device comprising:
a storage device storing a media access control learning table that stores therein learned entries each storing therein a correspondence relationship among a port number for identifying a port, an address of a terminal connected via the port, a group identifier for identifying a terminal group to which the terminal belongs, the terminal group being one of a plurality of terminal groups, and an aging value indicating a period of time elapsed since each learned entry is stored in the media access control learning table, and storing a learning management table that stores therein a current learning number, a minimum learning number, a maximum learning number, a predetermined priority in association with each group identifier, and an aging timer value indicating a retention period of a correspondence relationship in association with each group identifier, the current learning number indicating a number of the learned entries currently stored in the first storage unit, the minimum learning number indicating a minimum value of the current learning number, the maximum learning number indicating a maximum value of the current learning number;
a memory; and a processor coupled to the memory and configured to execute instructions in the memory to perform:

determine, when a frame is received, whether a total of current learning numbers stored in the learning management table has reached a total of maximum learning numbers, identify in the learning management table, when it is determined that the total of current learning numbers has reached the total of maximum learning numbers, a first group identifier associated with a lower priority than a priority associated with a reception group identifier contained in the frame, the first group identifier being associated with a first current learning number not less than a first minimum learning number associated with the first group identifier, perform, in the media access control learning table, first replacement of a first correspondence relationship including the first group identifier with a reception correspondence relationship among a port number of a port at which the frame has been received, a source address contained in the frame, and the reception group identifier, determine whether a first aging value stored in a first learned entry has reached a first aging timer value stored in the learning management table in association with a second group identifier included in the first learned entry, delete, when it is determined that the first aging value has reached the first aging timer value, the first learned entry from the media access control learning table and determine whether a second current learning number associated with the second group identifier in the learning management table is less than a second minimum learning number associated with the second group identifier, and extend the first aging timer value when it is determined that the second current learning number is less than the second minimum learning number.

2. The communication device according to claim 1, wherein
the processor is further configured to perform:
determine, when it is determined that the total of current learning numbers has reached the total of maximum learning numbers, whether a reception current learning number associated with the reception group identifier in the learning management table has reached a reception minimum learning number associated with the reception group identifier, and
perform the first replacement when it is determined that the reception current learning number has reached the reception minimum learning number.

3. The communication device according to claim 2, wherein
the processor is further configured to perform:
identify in the learning management table, when it is determined that the reception current learning number is less than the reception minimum learning number, a second group identifier associated with a second current learning number not less than a second minimum learning number associated with the second group identifier, and
perform, in the media access control learning table, second replacement of a second correspondence relationship including the second group identifier with the reception correspondence relationship.

4. The communication device according to claim 2, wherein the processor is further configured to perform:
discard or flood the frame without storing the reception correspondence relationship in the media access control learning table when the first group identifier is not identified in the learning management table.

5. The communication device according to claim 1, wherein
the processor is further configured to perform:
store, when it is determined that the total of current learning numbers is less than the total of maximum learning numbers, the reception correspondence relationship in a blank entry of the media access control learning table.

6. The communication device according to claim 1, wherein
the processor is further configured to perform:
determine, when it is determined that the second current learning number has reached the second minimum learning number, whether the second current learning number has exceeded a first maximum learning number associated with the second group identifier, and
shorten the first aging timer value when it is determined that the second current learning number has exceeded the first maximum learning number.

7. An address learning method performed by a computer, the method comprising:
storing, by the computer, learned entries in a first storage unit, each of the learned entries storing therein a correspondence relationship among a port number for identifying a port, an address of a terminal connected via the port, a group identifier for identifying a terminal group to which the terminal belongs, the terminal group being one of a plurality of terminal groups, and an aging value indicating a period of time elapsed since each learned entry is stored in the media access control learning table;
referring, when a frame is received, to a second storage unit storing therein a current learning number, a minimum learning number, a maximum learning number, a predetermined priority in association with each group identifier, and an aging timer value indicating a retention period of a correspondence relationship in association with each group identifier, the current learning number indicating a number of the learned entries currently stored in the first storage unit, the minimum learning number indicating a minimum value of the current learning number, the maximum learning number indicating a maximum value of the current learning number;
determining whether a total of current learning numbers stored in the second storage unit has reached a total of maximum learning numbers;
identifying in the second storage unit, when it is determined that the total of current learning numbers has reached the total of maximum learning numbers, a first group identifier associated with a lower priority than a priority associated with a reception group identifier contained in the frame, the first group identifier being associated with a first current learning number not less than a first minimum learning number associated with the first group identifier;
performing, in the first storage unit, replacement of a first correspondence relationship including the first group identifier with a reception correspondence relationship among a port number of a port at which the frame has been received, a source address contained in the frame, and the reception group identifier;

determining whether a first aging value stored in a first learned entry has reached a first aging timer value stored in the second storage unit in association with a second group identifier included in the first learned entry, deleting, when it is determined that the first aging value has reached the first aging timer value, the first learned entry from the first storage unit table and determine whether a second current learning number associated with the second group identifier in the second storage unit is less than a second minimum learning number associated with the second group identifier, and extending the first aging timer value when it is determined that the second current learning number is less than the second minimum learning number.

8. A non-transitory computer-readable recording medium having stored therein a program for causing a computer to execute a process, the process comprising:

storing learned entries in a first storage unit, each of the learned entries storing therein a correspondence relationship among a port number for identifying a port, an address of a terminal connected via the port, and a group identifier for identifying a terminal group to which the terminal belongs, the terminal group being one of a plurality of terminal groups;

referring, when a frame is received, to a second storage unit storing therein a current learning number, a minimum learning number, a maximum learning number, and a predetermined priority in association with each group identifier, the current learning number indicating a number of the learned entries currently stored in the first storage unit, the minimum learning number indicating a minimum value of the current learning number, the maximum learning number indicating a maximum value of the current learning number;

determining whether a total of current learning numbers stored in the second storage unit has reached a total of maximum learning numbers;

identifying in the second storage unit, when it is determined that the total of current learning numbers has reached the total of maximum learning numbers, a first group identifier associated with a lower priority than a priority associated with a reception group identifier contained in the frame, the first group identifier being associated with a first current learning number not less than a first minimum learning number associated with the first group identifier;

performing, in the first storage unit, replacement of a first correspondence relationship including the first group identifier with a reception correspondence relationship among a port number of a port at which the frame has been received, a source address contained in the frame, and the reception group identifier;

determining whether a first aging value stored in a first learned entry has reached a first aging timer value stored in the second storage unit in association with a second group identifier included in the first learned entry, deleting, when it is determined that the first aging value has reached the first aging timer value, the first learned entry from the first storage unit table and determine whether a second current learning number associated with the second group identifier in the second storage unit is less than a second minimum learning number associated with the second group identifier, and extending the first aging timer value when it is determined that the second current learning number is less than the second minimum learning number.

* * * * *